US009069512B2

(12) United States Patent
Masumoto (10) Patent No.: US 9,069,512 B2
(45) Date of Patent: Jun. 30, 2015

(54) DISPLAYING SCREEN INFORMATION OF A PRINTING DEVICE ON A CLIENT DEVICE IN ACCORDANCE WITH A TYPE OF CLIENT DEVICE

(71) Applicant: Canon Kabushiki Kaisha, Tokyo (JP)

(72) Inventor: Kazuyuki Masumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/140,395

(22) Filed: Dec. 24, 2013

(65) Prior Publication Data

US 2014/0185094 A1    Jul. 3, 2014

(30) Foreign Application Priority Data

Dec. 28, 2012 (JP) ................. 2012-288231

(51) Int. Cl.
*H04N 1/00* (2006.01)
*G06F 3/12* (2006.01)

(52) U.S. Cl.
CPC ............ *G06F 3/1292* (2013.01); *G06F 3/1203* (2013.01); *G06F 3/1231* (2013.01)

(58) Field of Classification Search
CPC .......................... H04N 1/00503; G06F 3/1293
USPC ...................................................... 358/1.15
See application file for complete search history.

(56) References Cited

U.S. PATENT DOCUMENTS

2011/0153729 A1*  6/2011  Kawai et al. .................. 709/203

FOREIGN PATENT DOCUMENTS

JP      2007-114888 A      5/2007
JP      2011-124914    *   6/2011

OTHER PUBLICATIONS

Machine Elnglish Language Translation of JP 2011-124914 to IDE.*

* cited by examiner

*Primary Examiner* — Eric A Rust
(74) *Attorney, Agent, or Firm* — Canon USA, Inc. I.P. Division (57) ABSTRACT

An information processing apparatus includes a storing unit configured to store a plurality of pieces of screen information, each corresponding to a type of an external device that is capable of accessing the apparatus, a transmitting unit configured to transmit the screen information to the external device, a receiving unit configured to receive an instruction request that is based on the screen information displayed in the external device, and an executing unit configured to execute processing in response to the instruction request received by the receiving unit. The screen information includes a common section that is common among the plurality of pieces of screen information regardless of the type of the external device and a difference section that differs among the plurality of pieces of screen information depending on the type of the external device.

18 Claims, 6 Drawing Sheets

DISPLAYING SCREEN INFORMATION OF A PRINTING DEVICE ON A CLIENT DEVICE IN ACCORDANCE WITH A TYPE OF CLIENT DEVICE

BACKGROUND OF THE INVENTION

1. Field of the Invention

The present invention relates to information processing apparatuses that can connect to external apparatuses and to information processing methods.

2. Description of the Related Art

Remote control techniques for controlling image forming apparatuses such as a printer from mobile terminals (hereinafter, referred to as "terminal devices") such as a computer terminal, a smartphone, and a tablet is known. In order to control an image forming apparatus remotely from a terminal device, a user interface screen for operating the image forming apparatus is displayed on the terminal device. When remotely controlling the image forming apparatus from the terminal device, the image forming apparatus transmits, to the terminal device, the user interface screen for operating the image forming apparatus. The user interface screen is then displayed in an application such as a browser in the terminal device (see Japanese Patent Laid-Open No. 2007-114888). According to the technique discussed in Japanese Patent Laid-Open No. 2007-114888, a remote operation terminal device that operates another device obtains device information from the other device. The remote operation terminal device then constructs a user interface for operating the other device on the basis of a device template that is compatible with the other device and the obtained device information.

The technique discussed in Japanese Patent Laid-Open No. 2007-114888, however, does not take the screen size of the terminal device (i.e., the size of the display area) into account. Therefore, the technique may not be suitable for some terminal devices.

The present invention provides an apparatus, a system, and a method that make it possible to display, in a display unit of a terminal device, screen information in accordance with the type of the terminal device.

SUMMARY OF THE INVENTION

An apparatus according to an aspect of the present invention includes a storing unit configured to store a plurality of pieces of screen information, each corresponding to a type of an external device that is capable of accessing the apparatus, a transmitting unit configured to transmit the screen information to the external device, a receiving unit configured to receive an instruction request that is based on the screen information displayed in the external device, and an executing unit configured to execute processing in response to the instruction request received by the receiving unit. The screen information includes a common section that is common among the plurality of pieces of screen information regardless of the type of the external device and a difference section that differs among the plurality of pieces of screen information depending on the type of external device.

Further features of the present invention will become apparent from the following description of exemplary embodiments with reference to the attached drawings.

DESCRIPTION OF THE EMBODIMENTS

Hereinafter, embodiments of the present invention will be described in detail with reference to the appended drawings. It should be noted that the embodiments described hereinafter do not limit the present invention set forth in the claims and that not all of the combinations of described features are essential for implementing the present invention.

First Embodiment

Figure 1:
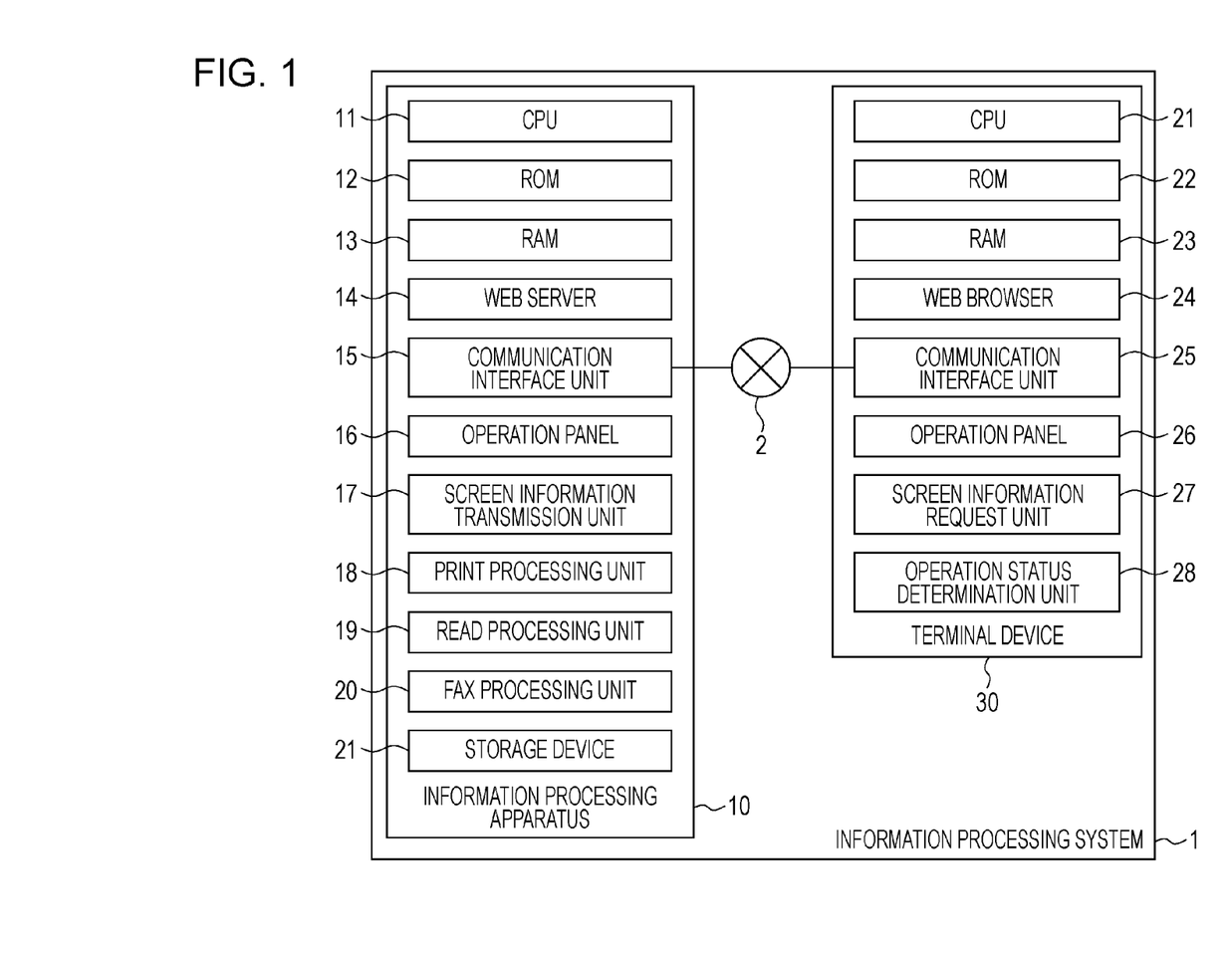
FIG. 1 conceptually illustrates a system configuration of an information processing system according to a first embodiment.

FIG. 1 is a block diagram illustrating a configuration of an information processing system 1 according to a first embodiment. The information processing system 1 includes an information processing apparatus 10 and a terminal device 30 for remotely controlling the information processing apparatus 10. The information processing apparatus 10 and the terminal device 30 are interconnected through a wired or wireless network 2.

Examples of the information processing apparatus 10 include a copy machine, a printer, and a fax, which each can connect to a network, and a multifunction peripheral (MFP) equipped with a plurality of functions such as a scanner function, a printer function, and a facsimile function. In the first embodiment, a multifunction peripheral serves as an example of the information processing apparatus 10.

The information processing apparatus 10 includes a CPU 11 that controls the apparatus as a whole, a ROM 12 that stores programs and data, and a RAM 13 that includes a temporary storage area such as an image memory. The information processing apparatus 10 further includes a web server 14, a communication interface unit 15, an operation panel 16, and a screen information transmission unit 17. Additionally, the information processing apparatus 10 includes a print processing unit 18, a read processing unit 19, and a fax processing unit 101. These components are connected through a system bus (not illustrated).

The CPU 11 operates in accordance with information stored in the ROM 12 and the RAM 13 so as to control the information processing apparatus 10 as a whole.

The ROM 12 stores programs that indicate a control procedure, a processing procedure, and so on of the CPU 11, and the RAM 13 retains a work area, information, and so on that are necessary for control processing of the information processing apparatus 10.

The web server 14 transmits a web page through the network 2 in response to a request from a web browser 24. In addition, the web server 14 receives a request from the web browser 24 of the terminal device 30 which instructs the information processing apparatus 10 to carry out processing.

The operation panel 16 allows a user to input predetermined instructions therein and can also display various pieces of information. The user can provide an instruction to and configure settings for the information processing apparatus 10 through the operation panel 16.

The communication interface unit 15 is configured to allow the information processing apparatus 10 to communicate with the terminal device 30 through the wired or wireless network 2. In the first embodiment, the communication interface unit 15 is configured to allow the web server 14 of the information processing apparatus 10 to communicate with the web browser 24 of the terminal device 30.

The screen information transmission unit 17 transmits screen information (e.g., web page) such as operation screen data for operating the information processing apparatus 10 in response to a request for the operation screen data from the web browser 24.

The information processing apparatus 10 further includes a storage device 102 such as a hard disk, in which a plurality of pieces of screen information, each corresponding to a type of the terminal device 30, are stored. Each piece of the screen information includes setting values for the information processing apparatus 10 written in HTML, CSS, JavaScript (registered trademark), and so on, and includes a common section that is common among the plurality of pieces of screen information and a section that differs among the plurality of pieces of screen information. In the first embodiment, information that indicates whether or not components such as a back button and a reload button are to be displayed on a display screen is written in CSS. Such information that indicates whether or not the back button and the reload button are to be displayed corresponds to the section of the screen information that differs among the plurality of pieces of screen information in image information. In the first embodiment, the image information includes screen information for a smartphone terminal and screen information for a tablet terminal, and either screen information displays content that enables input of instructions equivalent to those in the operation panel 16. The screen information for a tablet terminal corresponds to screen information for a standard screen and displays a "reload" button without displaying a "back" button in a configuration screen, which will be described later in detail. Meanwhile, the screen information for a smartphone terminal corresponds to screen information for a small screen and displays a "back" button in a configuration screen.

The print processing unit 18 records (prints) an image, the read processing unit 19 reads an image, and the fax processing unit 101 carries out fax processing. The information processing apparatus 10 of the first embodiment includes the read processing unit 19 and the print processing unit 18 and is thus equipped with three functions including copying of images, scanning of images, and multi-crop copying of images.

The terminal device 30 includes the web browser 24 and is capable of operating the information processing apparatus 10 through the network 2. Examples of the terminal device 30 include a personal computer (PC) and a smartphone.

The terminal device 30 includes a CPU 21, a ROM 22, and a RAM 23. The terminal device 30 further includes the web browser 24, a communication interface unit 25, an operation panel 26, a screen information request unit 27, and an operation status determination unit 28. These components are connected through a system bus (not illustrated).

The CPU 21 operates in accordance with information stored in the ROM 22 and the RAM 23 so as to control the terminal device 30 as a whole.

The ROM 22 stores programs that indicate a control procedure, a processing procedure, and so on of the CPU 21, and the RAM 23 retains a work area, information, and so on that are necessary for control processing of the terminal device 30.

The communication interface unit 25 is configured to allow the terminal device 30 to communicate with the information processing apparatus 10 through the network 2.

The web browser 24 is a network client and is capable of downloading screen information such as the operation screen data through the network 2 and displaying the screen information on the operation panel 26. A generic web browser can be used as the web browser 24. In the first embodiment, the web browser 24 includes functions of displaying the screen information on the operation panel 26 and transmitting, to the web server 14, content of a user instruction that is based on the screen information (operation screen data). The web browser 24 selects, among the plurality of pieces of screen information transmitted from the screen information transmission unit 17, an appropriate piece of screen information on the basis of a user agent, which will be described later in detail.

The communication interface unit 25 allows the user to input predetermined instructions and can also display various pieces of information. The user can provide instructions to and configure settings for the terminal device 30 and the information processing apparatus 10 through the operation panel 26. In other words, the user can input an instruction for operating the information processing apparatus 10 and can configure settings for the information processing apparatus 10 by operating the operation panel 26, which will be described later in detail.

The screen information request unit 27 requests the operation screen data from the screen information transmission unit 17 of the information processing apparatus 10.

The operation panel 26, which is a display device of the terminal device 30, allows the user to input predetermined instructions therein and can also display various pieces of information. The user provides an instruction to and configures settings for the information processing apparatus 10 through the operation panel 26. Note that the screen information obtained from the screen information transmission unit 17 is displayed in a screen display area of the operation panel 26.

As described above, the information processing system 1 includes the information processing apparatus 10, which includes the web server 14, and the terminal device 30, which includes the web browser 24, and is configured to allow the information processing apparatus 10 to be controlled from the terminal device 30. In the information processing system 1 of the first embodiment, the information processing apparatus 10 can be controlled through the operation of the information processing apparatus 10 itself and can also be controlled through the operation of the terminal device 30.

Specifically, the communication interface unit 15 is connected to the communication interface unit 25 through the network 2, which enables the web server 14 to communicate with the web browser 24. Upon receiving a request for the screen information from the screen information request unit 27 of the terminal device 30, the screen information transmission unit 17 of the information processing apparatus 10 transmits display content that can display instructions similar to those on the operation panel 16 to the web browser 24 through the web server 14. The screen information is then displayed in the operation panel 26 of the terminal device 30, and the user can operate the operation panel 26 so as to remotely operate the information processing apparatus 10.

The information processing apparatus 10 includes the print processing unit 18, the read processing unit 19, and the fax processing unit 101, and while these units are in operation, the status of each job being executed is notified to the terminal device 30 through the network 2. The terminal device 30 analyzes the notified information in the operation status determination unit 28 to thus determine whether the information processing apparatus 10 is executing a job.

The notification of the status from the information processing apparatus 10 to the terminal device 30, the determination of the status by the terminal device 30, the transmission of the screen information are realized, for example, by executing JavaScript (registered trademark) embedded in web pages displayed in the terminal device 30.

Figure 2:
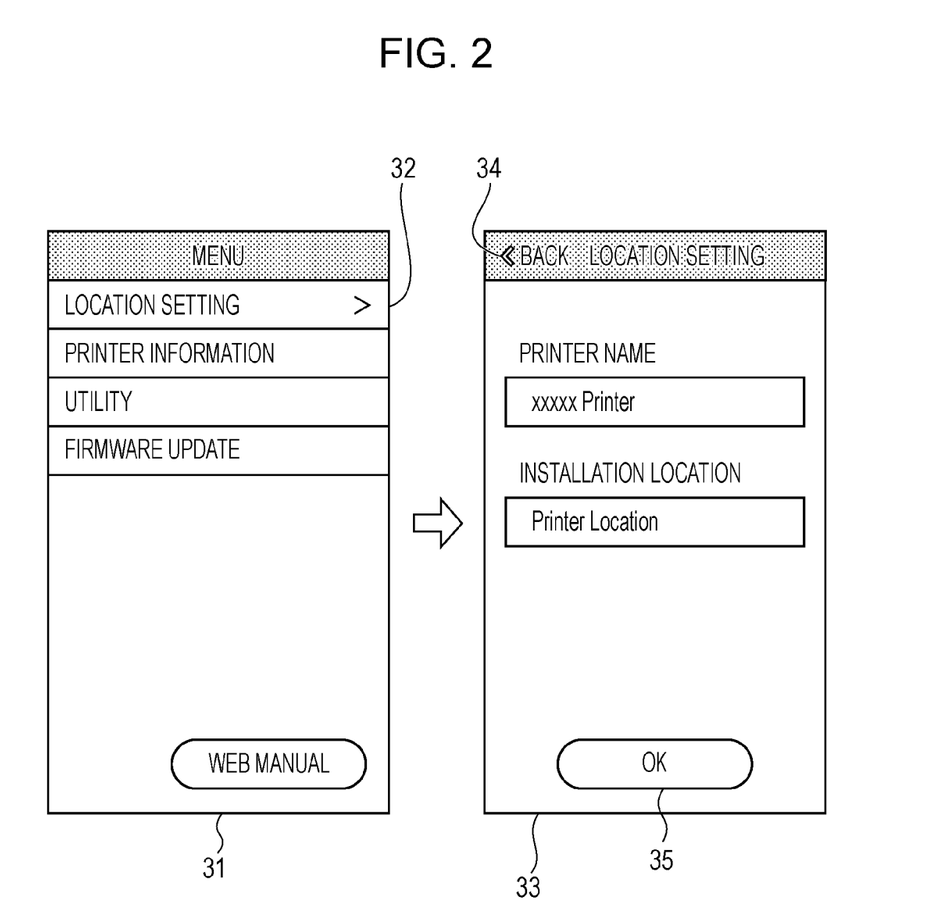
FIG. 2 illustrates a user interface for a smartphone type terminal according to the first embodiment.
Figure 3:
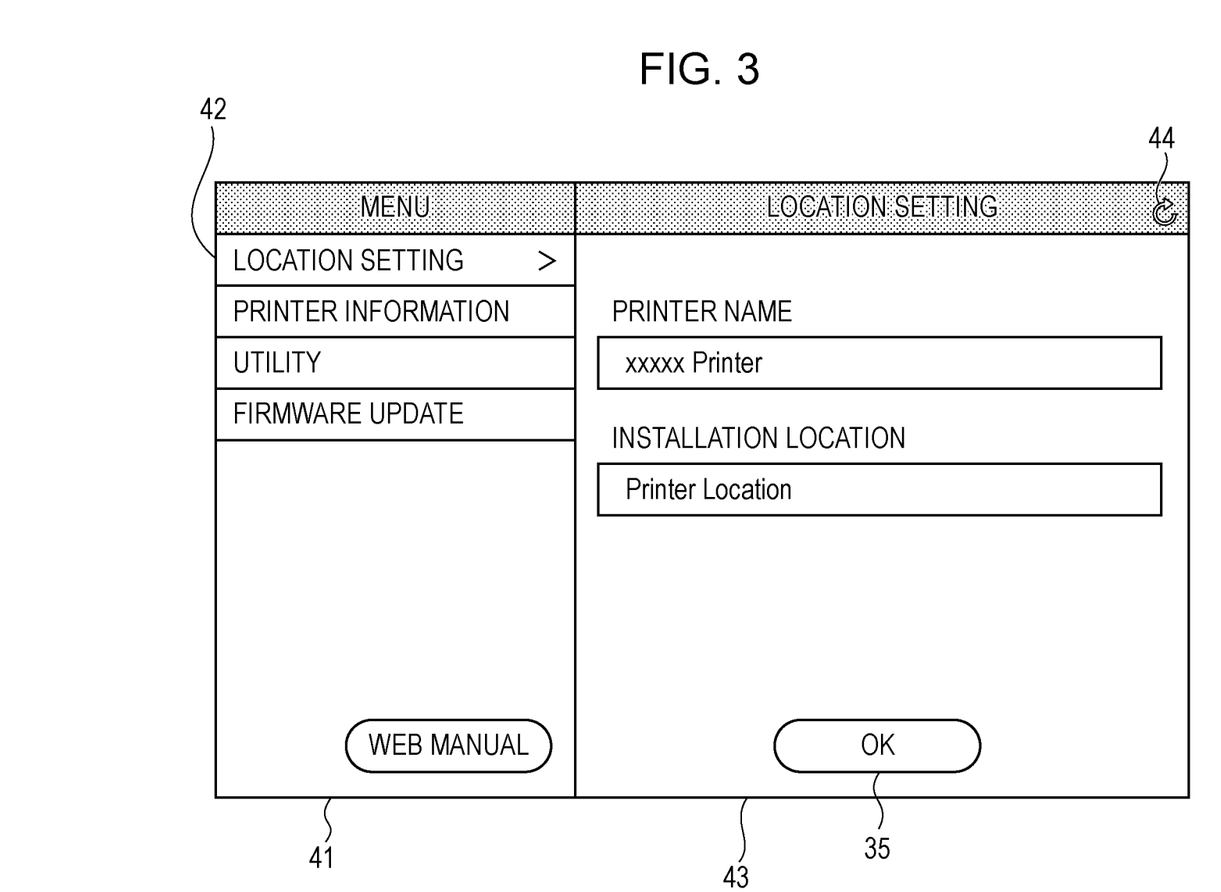
FIG. 3 illustrates a user interface for a tablet type terminal according to the first embodiment.
Figure 4:
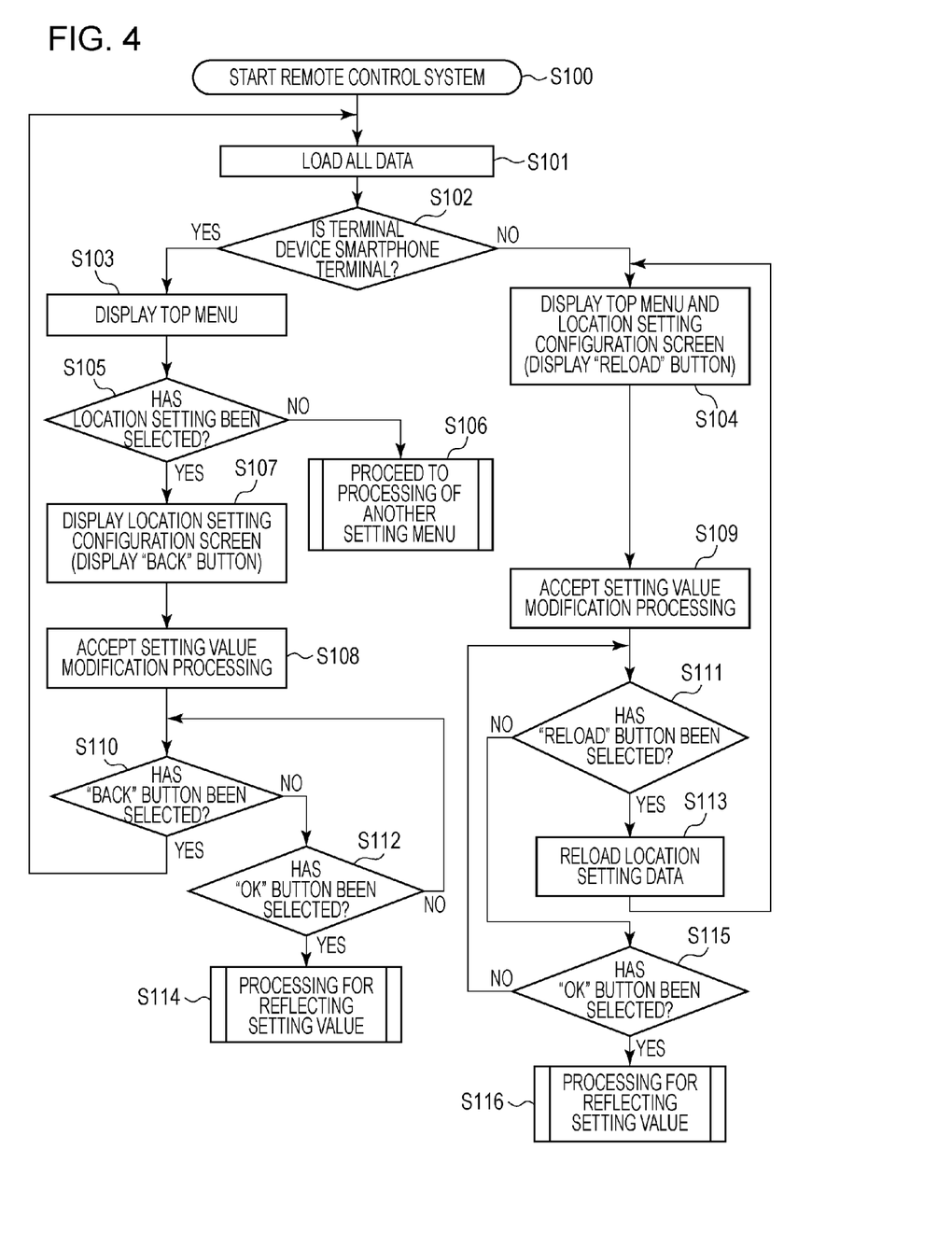
FIG. 4 is a flowchart of display control processing in a terminal device according to the first embodiment.

Subsequently, a method for controlling display in accordance with the type of the terminal device 30 of the information processing system 1 according to the first embodiment will be described with reference to FIGS. 2 to 4. FIG. 2 illustrates a user interface screen for a smartphone type terminal according to the first embodiment. FIG. 3 illustrates a user interface screen for a tablet type terminal according to the first embodiment. FIG. 4 is a flowchart of processing carried out by the CPU 21 of the terminal device 30.

As illustrated in FIG. 2, a top menu screen 31 is first displayed on the user interface screen for a smartphone type terminal according to the first embodiment. The top menu screen 31 includes various menu items and a web manual. As the various menu items, for example, "location setting," "printer information," "utility," and "firmware update" are displayed. When a location setting menu 32 is pressed, the screen display moves (shifts) to a location setting configuration screen 33. Meanwhile, when the web manual is pressed, the screen display moves (shifts) to a manual screen (not illustrated). In the configuration screen 33, "printer name," "installation location," an OK button 35, and a back button 34 are displayed. If the OK button 35 is pressed, the location is set with the displayed printer name and installation location. Meanwhile, if the back button 34 is pressed, all the data is reloaded to return to the initial setting, and the screen display returns to the top menu 31.

In this manner, with a terminal device having a small display area such as a smartphone type terminal, a menu screen is first displayed, and the screen display shifts to a configuration screen selected through the menu screen. Thus, with a smartphone terminal in the first embodiment, the back button 34 is disposed at an upper left side of a screen so that all the data is reloaded when the screen display returns to the top menu 31 for a smartphone by pressing the back button 34.

As illustrated in FIG. 3, in the user interface screen for a tablet type terminal, a top menu screen 41 for a tablet and a configuration screen 43 are displayed simultaneously. Here, a configuration screen selected through the top menu screen 41 is displayed in the configuration screen 43. The top menu screen 41 includes various menu items and a web manual. As the various menu items, for example, "location setting," "printer information," "utility," and "firmware update" are displayed. When the web manual is pressed, the screen display moves to a manual screen (not illustrated). The above points are similar to those described with reference to FIG. 2. When a location setting menu 42 is pressed, the location setting configuration screen 43 is displayed at the right side of the screen. In the location setting configuration screen 43, "printer name," "installation location," the OK button 35, and a reload button 44 are displayed. If the OK button 35 is pressed, the location is set with the displayed printer name and installation location. Meanwhile, if the reload button 44 is pressed, the data is reloaded, and the location setting returns to the initial setting. In this manner, in the user interface for a tablet type terminal, the configuration screen 43 can be reloaded by pressing the reload button 44, and thus the configuration screen does not need to be reloaded by switching back to the top menu screen 41.

As described above, in the first embodiment, a back button is displayed in a configuration screen of a terminal device having a small display area such as a smartphone type terminal. This back button includes functions of reloading data and returning to the top menu. Meanwhile, a reload button is displayed in a configuration screen of a terminal device having a relatively large display area such as a tablet type terminal. In this manner, the same function, namely reloading data, is assigned to buttons with different labels in accordance with the type of the terminal device.

With reference to FIG. 4, display control carried out by the CPU 21 of the terminal device 30 of the first embodiment will be described. Here, a case where the location setting is configured will be described as an example.

First, when the information processing system 1 is started (S100), the terminal device 30 loads, from the web server 14, screen information that is necessary for displaying the user interface screen for operating the information processing apparatus 10 (S101). The screen information to be loaded here may include setting values for the information processing apparatus 10 written in HTML, CSS, JavaScript (registered trademark), and so on.

Subsequently, the terminal device 30 determines whether the terminal device 30 is a smartphone type terminal or a tablet type terminal (S102). Although the terminal device 30 determines whether the terminal device 30 is a smartphone type terminal or a tablet type terminal in the first embodiment, the first embodiment is not limited thereto, and the terminal device 30 may determine, for example, which one of a smartphone type terminal, a tablet type terminal, and a PC the terminal device 30 is or may determine whether or not the terminal device 30 is a smartphone type terminal. In the first embodiment, a terminal that does not belong to smartphone type terminals is determined to be a tablet type terminal. In other words, the terminal device 30 determines whether or not the terminal device 30 is a smartphone type terminal. In the first embodiment, the determination as to whether the terminal device 30 is a smartphone type terminal or a tablet type terminal is made by determining whether or not a specific character string is included in a character string, which is called a user agent, for identifying the type of the terminal device 30. The user agent is included in the web browser 24 of the terminal device 30. If the user agent includes a specific character string such as "mobile," which is a character string for identifying a smartphone type terminal, the terminal device 30 is determined to be a smartphone type terminal. Meanwhile, if the user agent does not include the specific character string for identifying a smartphone type terminal, the terminal device 30 is determined to be a tablet type terminal.

If the terminal device 30 is determined to be a smartphone type terminal in S102, the terminal device 30 selects screen information for a smartphone (i.e., screen information for a small screen in the first embodiment) and displays the top menu 31 for a smartphone (S103).

The terminal device 30 then determines whether or not a menu has been selected through the top menu (S105). Specifically, the terminal device 30 determines whether or not "location setting" has been selected.

If the location setting menu 32 is selected in S105, the screen display shifts to the location setting configuration screen 33 and displays the location setting configuration screen 33 (S107). In the screen information for a smartphone terminal of the first embodiment, the back button 34 is displayed in the location setting configuration screen 33. Thereafter, the processing proceeds to S108. If another menu is selected in S105, the terminal device 30 proceeds to processing for the other setting menu (S106). In S108, the terminal device 30 enters a state in which the terminal device 30 can accept a user instruction for modifying the setting values such as the printer name and the installation location through the location setting configuration screen 33 displayed in the operation panel 26, and the processing then proceeds to S110. If the terminal device 30 has accepted an instruction to modify the setting values, the modification is reflected in the configuration screen 33.

In S110, the terminal device 30 determines whether or not the back button 34 has been pressed. If the back button 34 has been pressed, the processing returns to S101, and all the data is reloaded. Thereafter, the screen display returns to the top menu 31 through S102 (S103). Meanwhile, if the back button 34 has not been pressed, the processing proceeds to S112.

In S112, the terminal device 30 determines whether or not the OK button 35 has been pressed. If the OK button 35 has not been pressed in S112, the processing returns to S110. If the OK button 35 has been pressed in S112, the setting values are not returned to the original values, and processing for reflecting the setting values is carried out (S114). For example, various processes such as setting the location of the information processing apparatus 10 and printing by the print processing unit 18 are carried out.

If the terminal device 30 is determined to be a tablet type terminal in S102, the terminal device 30 selects screen information for a tablet (i.e., standard screen information in the first embodiment) and displays the top menu 41 for a tablet terminal (S104). Specifically, as illustrated in FIG. 3, since a tablet terminal has a large display area, the menu screen and the configuration screen can be displayed simultaneously, and a configuration screen selected from the menu is displayed next to the menu. Here, since the top menu 41 for a tablet is displayed all the time, the reload button 44 is disposed at the upper right side of the screen. In other words, the data is reloaded not by displaying the top menu 41 again but by pressing the reload button 44 in the configuration screen 43. Thereafter, the processing proceeds to S109.

In S109, the terminal device 30 enters a state in which the terminal device 30 can accept a user instruction for modifying the setting values such as the printer name and the installation location through the location setting configuration screen 43 displayed in the operation panel 26, and the processing then proceeds to S111. If the terminal device 30 has accepted an instruction to modify the setting values, the modification is reflected in the configuration screen 43.

In S111, the terminal device 30 determines whether or not the reload button 44 has been pressed. If the reload button 44 has been pressed, the processing proceeds to S113. In S113, the data for the location setting is loaded, and the processing returns to S104. In other words, upon the processing returning to S104, the location setting configuration screen 43 is regenerated and displayed with the setting values being initialized. Meanwhile, if the reload button 44 has not been pressed, the processing proceeds to S115.

In S115, the terminal device 30 determines whether or not the OK button 35 has been pressed. If the OK button 35 has not been pressed in S115, the processing returns to S111. If the OK button 35 has been pressed in S115, the setting values are not returned to the original values, and processing for reflecting the setting values is carried out (S116). For example, various processes such as setting the location of the information processing apparatus 10 and printing by the print processing unit 18 are carried out.

Although not illustrated, if an instruction for terminating the application indicated by closing the display screen of the operation panel 26 is received, the remote processing is terminated.

In the information processing system 1 of the first embodiment in which the screen information (user interface screen) for operating the information processing apparatus 10 is displayed and operated in the web browser 24 of the terminal device 30, the screen information is modified (selected) on the basis of whether the terminal device 30 is a smartphone type terminal or a tablet type terminal. In the first embodiment, one of the screen information for a tablet, which displays the reload button for obtaining the data again, and the screen information for a smartphone, which does not display the reload button, is selected, and the selected screen information is displayed in the display area of the operation panel 26. With the screen information for a tablet, displaying the reload button makes it possible to reload data by pressing the reload button even in a display screen that does not allow the data to be reloaded by regenerating the top menu. Meanwhile, with the smartphone type terminal, the data is reloaded by pressing the back button instead of the reload button. In other words, the back button is displayed with the screen information for a smartphone, and all the data is reloaded when the back button is pressed. Then, the terminal device 30 determines whether or not the terminal device 30 is a smartphone terminal, and the top menu is displayed on the basis of the result of the determination. Thus, an equivalent function can be provided for terminal devices having different display area sizes as in the case of a smartphone type terminal and a tablet type terminal, and the user operability can be improved.

Second Embodiment

In a second embodiment, the configuration of the information processing system 1 is similar to that of the first embodiment, and thus duplicate description thereof will be omitted.

A display control method according to the second embodiment will be described with reference to FIGS. 5 and 6.

Figure 5:
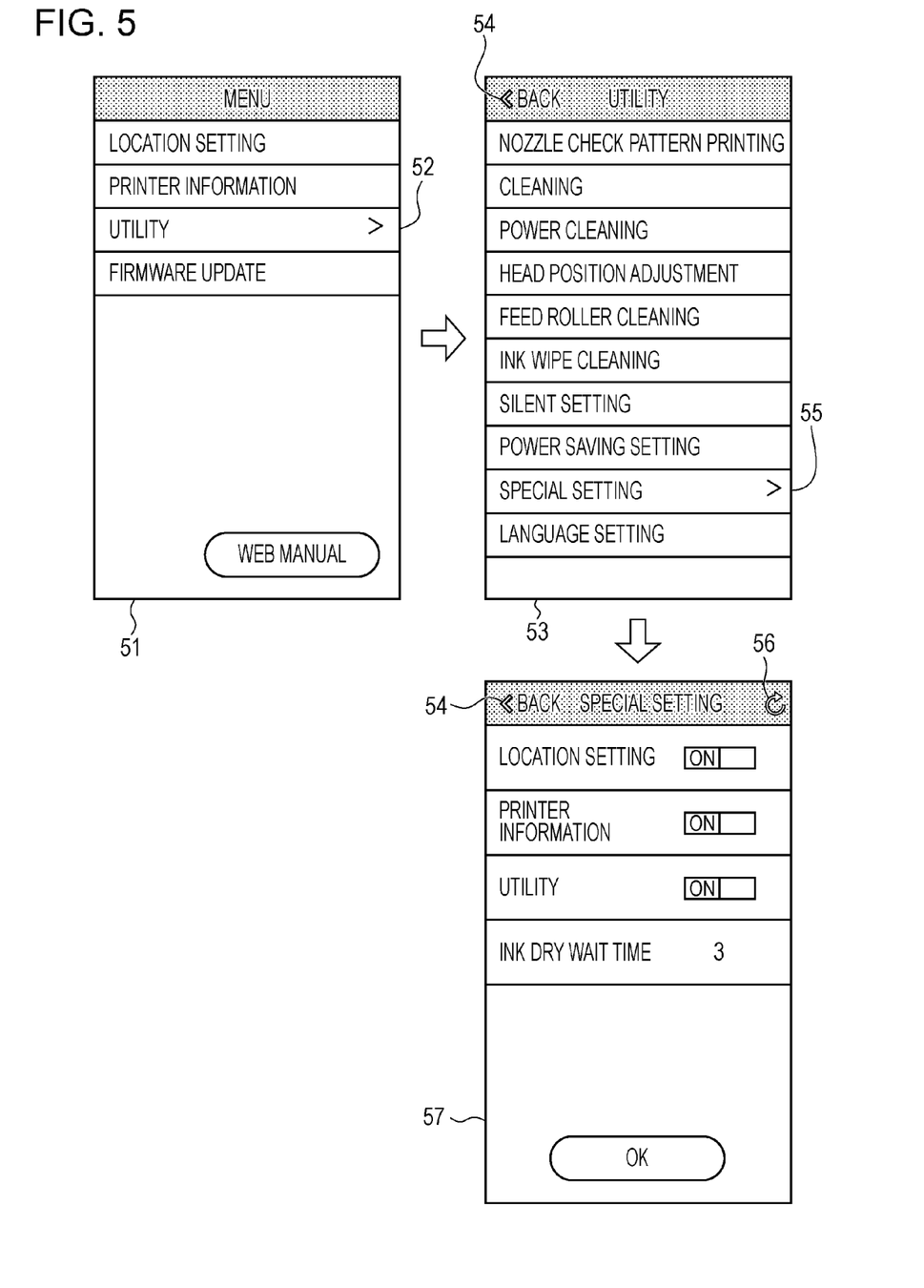
FIG. 5 illustrates a user interface for a smartphone type terminal according to a second embodiment.

FIG. 5 illustrates a user interface screen for a smartphone type terminal according to the second embodiment. As illustrated in FIG. 5, a top menu screen 51 is first displayed in the user interface screen for a smartphone type terminal according to the second embodiment. The top menu screen 51 includes various menu items and a web manual. As the various menu items, for example, "location setting," "printer information," "utility," and "firmware update" are displayed. The operation carried out when the location setting menu is pressed is similar to that of the first embodiment, and thus description thereof will be omitted.

When a utility menu 52 is pressed, the screen display moves to a utility menu screen 53. When the web manual is pressed, the screen display moves to a manual screen (not illustrated). In the utility menu screen 53, utility menu items and a back button 54 are displayed. As the utility menu items, "nozzle check pattern printing," "cleaning," "power cleaning," "head position adjustment," "feed roller cleaning," "ink wipe cleaning," "silent setting," "power saving setting," "special setting," and "language setting" can be listed as examples. Here, a case where a special setting menu 55 is selected will be described. When the special setting menu 55 is selected, the screen display shifts to a special setting configuration screen 57. In the special setting configuration screen 57, various special setting items, an OK button, a back button 54, and a reload button 56 are displayed. Here, as the various special setting items, "location setting," "printer information," "utility," and "ink dry wait time" can be listed as examples. When the OK button is pressed, the special settings are set with the content specified through the configuration screen 57. When the back button 54 is pressed, the screen display returns to the utility menu screen 53. When the reload button 56 is pressed, all the data related to the special settings is reloaded to return to the initial settings.

In this manner, with a terminal device having a small display area such as a smartphone type terminal, as a selection is made, the screen display moves to a lower level in hierarchy. In the second embodiment, by displaying the reload button 56 when the user interface screen reaches or exceeds a predetermined level in the hierarchy, the data can be reloaded by pressing the reload button 56, instead of reloading the data by pressing the back button 54. In the second embodiment, the reload button 56 is displayed in a screen at a level equal to or deeper than the third level in the hierarchy. Although a case where the special setting is selected has been described as an example, the second embodiment is not limited thereto, and the reload button 56 is displayed in a screen at a level equal to or deeper than the third level in the hierarchy similarly in a case where another menu item is selected.

Figure 6:
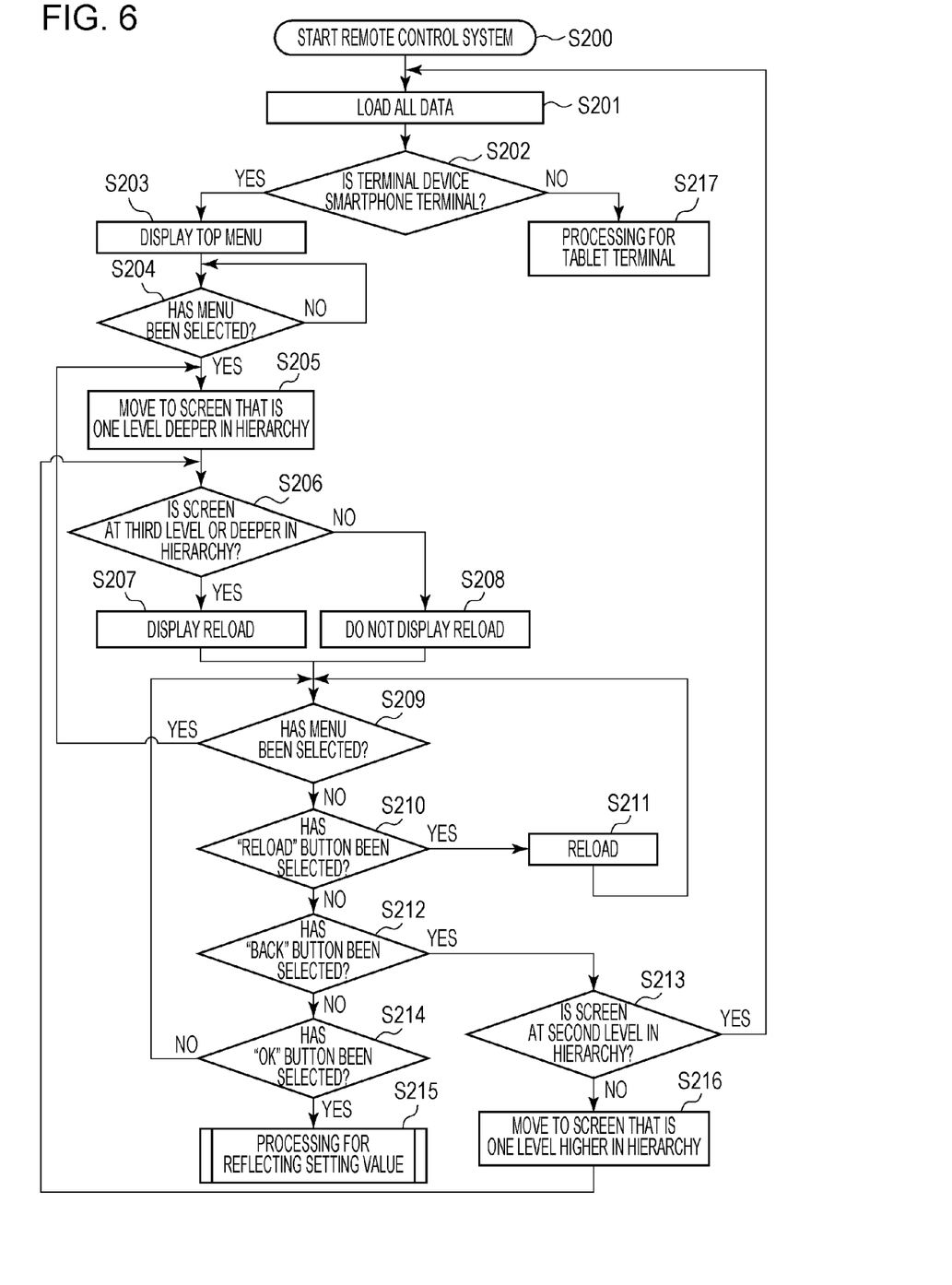
FIG. 6 is a flowchart of display control processing in a terminal device according to the second embodiment.

With reference to FIG. 6, the processing of the terminal device 30 will now be described. FIG. 6 is a flowchart of the processing carried out by the CPU 21 of the terminal device 30.

First, when the information processing system 1 is started (S200), the terminal device 30 loads, from the web server 14, screen information that is necessary for displaying the user interface screen for operating the information processing apparatus 10 (S201). The screen information to be loaded here may include setting values for the information processing apparatus 10 written in HTML, CSS, JavaScript (registered trademark), and so on.

Subsequently, the terminal device 30 determines whether the terminal device 30 is a smartphone type terminal or a tablet type terminal (S202). Although the terminal device 30 determines whether the terminal device 30 is a smartphone type terminal or a tablet type terminal in the second embodiment, the second embodiment is not limited thereto, and the terminal device 30 may determine, for example, which one of a smartphone type terminal, a tablet type terminal, and a PC the terminal device 30 is. Here, the determination as to whether the terminal device 30 is a smartphone type terminal or a tablet type terminal is made by determining whether or not a specific character string is included in a character string, which is called a user agent, for identifying the type of a terminal device.

If the terminal device 30 is determined to be a smartphone type terminal in S202, the top menu 31 for a smartphone is displayed (S203). The terminal device 30 then determines whether or not a menu has been selected through the top menu (S204). In the second embodiment, the terminal device 30 determines whether or not "location setting" has been selected.

If the terminal device 30 is determined to be a tablet type terminal in S202, the processing proceeds to the processing for a tablet type terminal (S217). The processing for a tablet type terminal is similar to the processes in S104, S109, S111, S113, S115, and S116 of the first embodiment, and thus description thereof will be omitted.

In S204, the terminal device 30 determines whether or not a menu has been selected through the top menu screen 51 for a smartphone. If a menu has been selected, the screen display shifts to a screen that is one level deeper in the hierarchy (S205), and the terminal device 30 determines whether or not the screen is at a level equal to or deeper than the third level in the hierarchy (S206). If the screen is at a level equal to or deeper than the third level in the hierarchy, the reload button 56 is displayed (S207), and the processing proceeds to S209. Meanwhile, if the screen is at a level higher than the third level in the hierarchy, the reload button 56 is not displayed (S208), and the processing proceeds to S209. If the utility menu 52 is selected through the top menu screen 51, the screen display shifts to the utility menu screen 53, in which the reload button is not displayed.

In S209, the terminal device 30 determines whether or not a menu has been selected through the displayed screen (S209). If a menu has been selected, the screen display shifts to a screen that is one level deeper in the hierarchy (S205), and the processing proceeds to S206. Meanwhile, if a menu has not been selected, the processing proceeds to S210.

In S210, the terminal device 30 determines whether or not the reload button 56 has been selected. If the reload button 56 has been selected, all the data on the currently displayed screen is reloaded to return to the initial settings (S211), and the processing then returns to S209. Meanwhile, if the reload button 56 has not been selected, the processing proceeds to S212.

In S212, the terminal device 30 determines whether or not the back button 54 has been selected. If the back button 54 has been selected, the processing proceeds to S213, and if the back button 54 has not been selected, the processing proceeds to S214.

In S213, the terminal device 30 determines whether or not the current screen is at the second level in the hierarchy. If the screen is at the second level in the hierarchy, the processing returns to S201, and all the data is loaded. If the screen is not at the second level in the hierarchy, the screen display shifts to a screen that is one level higher in the hierarchy (S216), and the processing then returns to S206.

In S214, the terminal device 30 determines whether or not the OK button has been pressed. If the OK button has not been pressed, the processing returns to S209. Meanwhile, if the OK button has been pressed, the setting values are not returned to the original values, and the processing for reflecting the setting values is carried out (S215).

Although not illustrated, if an instruction for terminating the application indicated by closing the display screen of the operation panel 26 is received, the remote processing is terminated.

In the interface screen for a smartphone terminal of the second embodiment, when the screen display reaches or exceeds the third level in the hierarchy, the reload button 56 is displayed. In other words, the reload button 56 is displayed even if the terminal device 30 is a smartphone type terminal when the screen display shifts to a screen that is at a level equal to or deeper than a predetermined level in the hierarchy. Thus, the setting values can be initialized through a single action, and the user operability in the smartphone type terminal device can be improved.

Additional Embodiment

Thus far, embodiments of the present invention have been described, but the basic configuration of the present invention is not limited to those described above. For example, although the predetermined level in the hierarchy is defined as the third level in the second embodiment, and the reload button is displayed when the screen reaches or exceeds the third level in the second embodiment, the present invention is not limited thereto. For example, the level at which the reload button is displayed can be set as desired, and the reload button may be displayed at a level that is appropriate while the user load is taken into consideration. In addition, the reload button may be displayed not at all the levels that are equal to or deeper than a predetermined level but only on a configuration screen that needs reloading.

In addition, although buttons that have different labels in accordance with the type of the terminal device, for example, have the same function, namely reloading, in the embodiments described above, the present invention is not limited thereto. For example, in place of the button, the same function may be assigned to a part of the screen.

Although a plurality of piece of screen information, each corresponding to a type of the terminal device 30, are transmitted to the terminal device 30, and the terminal device 30 selects a piece of screen information to display, the present invention is not limited thereto. For example, the information processing apparatus 10 may confirm the web browser of the terminal device 30 to select, among the plurality of pieces of screen information, a piece of screen information that is compatible with the terminal device 30 and may transmit the selected screen information to the terminal device 30.

Although the information processing system 1 in which the information processing apparatus 10 and the terminal device 30 are interconnected through the network 2 has been described as an example in the embodiments described above, the present invention is not limited to thereto. For example, an information processing apparatus and a terminal device may be interconnected through a local interface or through short-range wireless communication.

According to the present invention, screen information can be displayed in a display device in accordance with the type of the terminal device.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288231, filed Dec. 28, 2012, which is hereby incorporated by reference herein in its entirety.

What is claimed is:

1. An apparatus, comprising:
a storing unit configured to store a plurality of pieces of screen information, each corresponding to a type of an external device that is capable of accessing the apparatus;
a transmitting unit configured to transmit the screen information to the external device;
a receiving unit configured to receive an instruction request that is based on the screen information displayed in the external device; and
an executing unit configured to execute processing in response to the instruction request received by the receiving unit,
wherein the screen information includes a common section that is common among the plurality of pieces of screen information regardless of the type of the external device and a difference section that differs among the plurality of pieces of screen information depending on the type of the external device
wherein the screen information stored in the storing unit includes first screen information for displaying a reload object and second screen information for not displaying the reload object, the reload object allowing data on a display screen of the external device to return to an initial setting.

2. The apparatus according to claim 1, wherein the screen information stored in the storing unit includes first screen information for displaying a first item and second screen information for displaying a second item that has the same function as the first item but is different from the first item.

3. The apparatus according to claim 1,
wherein the screen information transmitted by the transmitting unit is displayed in a browser of the external device, and
wherein the difference section that differs depending on the type of the external device corresponds to a section that is distinguished by a user agent set in the browser.

4. The apparatus according to claim 1, wherein the screen information stored in the storing unit includes third screen information for displaying the reload object in a case where a display screen of the external device reaches or exceeds a predetermined level in a hierarchy, the reload object allowing data on the display screen of the external device to return to an initial setting.

5. The apparatus according to claim 1, further comprising:
a web server configured to transmit, to the external device, a web page for operating the apparatus to carry out processing,
wherein the receiving unit receives the instruction request from the external device through the web page.

6. The apparatus according to claim 5, wherein the apparatus transmits the web page to the external device in response to a request from the external device.

7. The apparatus according to claim 1, further comprising a printing unit for printing an image.

8. The apparatus according to claim 1, further comprising a reading unit for scanning an image.

9. The apparatus according to claim 1, wherein the reload object is a reload button.

10. An information processing system, comprising:
a first apparatus; and
a second apparatus capable of accessing the first apparatus,
wherein the second apparatus includes
a storing unit storing a plurality of pieces of screen information, each corresponding to a type of the first apparatus, a transmitting unit configured to transmit the screen information to the first apparatus, a receiving unit configured to receive an instruction request that is based on the screen information displayed in the first apparatus, and an executing unit configured to execute processing in response to the instruction request received by the receiving unit, wherein the screen information includes a common section that is common among the plurality of pieces of screen information regardless of the type of the first apparatus and a difference section that differs among the plurality of pieces of screen information depending on the type of the first apparatus, wherein the screen information stored in the storing unit includes first screen information for displaying a reload object and second screen information for not displaying the reload object, the reload object allowing data on a display screen of the external device to return to an initial setting and wherein the first apparatus includes a selecting unit configured to select, among the plurality of pieces of screen information transmitted from the transmitting unit of the second apparatus, a piece of screen information in accordance with the type of the first apparatus, a display control unit configured to cause a display unit to display the screen information selected by the selecting unit in a display device of the first apparatus, and a transmitting unit configured to transmit an instruction request to the second apparatus in accordance with the screen information displayed in the display device.

11. The system according to claim 10, wherein the plurality of pieces of screen information include first screen information for displaying a first item and second screen information for displaying a second item that has the same function as the first item but is different from the first item.

12. The system according to claim 10, wherein the type of the first apparatus is determined on the basis of a user agent of the first apparatus.

13. The system according to claim 10, wherein the second apparatus further comprising a printing unit for printing an image.

14. The system according to claim 10, wherein the second apparatus further comprising a reading unit for scanning an image.

15. A method in a system that includes a first apparatus and a second apparatus capable of accessing the first apparatus, the method comprising:

first transmitting, by the second apparatus, of a plurality of pieces of screen information, each corresponding to a type of the first apparatus, to the first apparatus;

selecting, by the first apparatus, of a piece of screen information from the plurality of pieces of screen information transmitted in the first transmitting in accordance with the type of the first apparatus;

displaying the screen information selected in the selecting in a display unit of the first apparatus;

second transmitting, by the first apparatus, of an instruction request to the second apparatus in accordance with the screen information displayed in the display unit; and executing, by the second apparatus, of the instruction request transmitted in the second transmitting, wherein the screen information includes a common section that is common among the plurality of pieces of screen information regardless of the type of the first apparatus and a difference section that differs among the plurality of pieces of screen information depending on the type of the first apparatus, wherein the screen information includes first screen information for displaying a reload object and second screen information for not displaying the reload object, the reload object allowing data on a display screen of the external device to return to an initial setting.

16. The method according to claim 15, wherein the plurality of pieces of screen information include first screen information for displaying a first item and second screen information for displaying a second item that has the same function as the first item but is different from the first item.

17. The method according to claim 15, wherein the type of the first apparatus is determined on the basis of a user agent of the first apparatus.

18. A non-transitory computer-readable recording medium storing a program that causes a computer to execute a method, the method comprising:

transmitting, to an external device that is capable of accessing an apparatus, a plurality of pieces of screen information, each corresponding to a type of the external device, the plurality of pieces of screen information being stored in a storing unit of the apparatus;

receiving an instruction request that is based on the screen information displayed in the external device; and executing processing in accordance with the instruction request received by the receiving unit, wherein the screen information includes a common section that is common among the plurality of pieces of screen information regardless of the type of the external device and a difference section that differs among the plurality of pieces of screen information depending on the type of the external device, wherein the screen information stored in the storing unit includes first screen information for displaying a reload object and second screen information for not displaying the reload object, the reload object allowing data on a display screen of the external device to return to an initial setting.

\* \* \* \* \*